June 27, 1933. J. L. ANDERSON 1,915,912
APPARATUS FOR CUTTING PIPE
Filed April 4, 1930 3 Sheets-Sheet 2

INVENTOR
James L. Anderson
BY
ATTORNEY

June 27, 1933.   J. L. ANDERSON   1,915,912
APPARATUS FOR CUTTING PIPE
Filed April 4, 1930   3 Sheets-Sheet 3

INVENTOR
James L. Anderson
BY
ATTORNEY

Patented June 27, 1933

1,915,912

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

APPARATUS FOR CUTTING PIPE

Application filed April 4, 1930. Serial No. 441,504.

This invention relates to apparatus for cutting pipe.

In some of the methods for the manufacture of pipe, long strips or sections of sheet or plate metal are bent continuously into cylindrical form, either by curving the body of the metal and bringing the longitudinal edges into proximity to form a straight line seam, or by twisting the metal into a helix to bring the edges into proximity in a helical seam. In either case the seam thus formed may be welded closed to produce a long pipe or tube member. Where the bent or twisted metal, formed as described, is not immediately welded, or where pipe is produced by welding such formed metal, it may be necessary to reduce long members, or a product of indefinite length, to usable or easily handled lengths.

It is an object of this invention to provide means for cutting such long or indefinite tubular lengths into sections of predetermined length in an efficient and economical manner. For this purpose, the functions of the oxyacetylene or like cutting torch using oxygen gas as its cutting medium are preferably utilized. The torch is positioned upon a support which may be rotated so that the oxygen jet issuing therefrom will describe a circle within a plane substantially vertical; any other desired arcuate path may be followed by properly supporting and rotating the torch carrier. Means are provided, in conjunction with the torch, so that, no matter what position the torch might assume, its tip will remain properly spaced from the surface of the pipe or skelp, which at the time is supported in the apparatus and is being cut. "Pipe" may be understood as including either welded pipe (or tube) or unwelded tube forms. "Skelp" will be used as a convenient term for unwelded tube forms.

Preferably, for the purposes of this invention, the pipe or skelp is held against any movement, either longitudinally or circumferentially. It is preferred that the welding operation or the bending and welding operations be brought to a complete halt against longitudinal motion, during the cutting operation. Slight rotational movement of the pipe may be compensated for by adjustment of the speed of rotation of the torch carrier to attain a relative speed of torch and pipe which will be in substantial accord with the cutting speed for the torch.

In the course of the forming operation, the sheet or plate metal is subjected to great deforming stresses from which the metal attempts to recover, when released, so that perceptible longitudinal bowing of the tube form appears, and the edges which were brought into proximity or contiguity tend to move apart. The separation of the edges is undesirable for the cutting operation, because of the variation in effective cutting speed which would result from the application to such a body, which is not truly circular in cross-section, of a cutting flame or like means moved at constant speed around a circular path. This condition would also impair the efficiency of the cutting operation where a beveled cut is made, in which case the changing of the distance from the center of the pipe to the cutting device would affect the accuracy of the bevel cut and make it nonuniform in its extent. It is an object of the invention to cope with this condition.

During the welding operation, the sheet edges may be fused together by a method involving fusion welding. Where such procedure is carried out, certain stress conditions are encountered which require consideration. During the step of fusing the edges, expansion of the metal occurs. Since the expansion is localized in the area of high temperatures arising from the welding device, the metal at that location is placed in compression and an upsetting action at the weld ensues. As the high temperature zone moves along the seam and leaves behind an area of fused metal, sharp congelation and therefore contraction sets in. No sufficient time is permitted the upset molten metal to return to its former relation in the body of the sheet; consequently a marked shortening of the length of the pipe along the seam results, with consequent stresses tending to bow the pipe.

In order to compensate for the bowing of the pipe, arising from the welding operation, it is desired to control bowing of the skelp, as it is delivered from the rolling mill, so that a bow in the reverse direction to that which will arise from the welding operation will be given to the skelp. It is an object of this invention to arrange apparatus which will serve as a fixed guide for the cutting apparatus in determining, at all times, the relation of pipe or skelp and the cutting device. The apparatus is constructed to prevent any material separation of the edges which have been forced into abutment during the forming operation. It further produces, according to its predetermined set condition with relation to the machine from which the pipe or skelp to be cut is fed to it, any desired additional working of the metal of the skelp or tube, so that either the bowing in the pipe or skelp will be counteracted or deliberate bowing will be given the skelp to counteract the effects arising from thereafter welding the skelp into pipe.

For these purposes there is assembled with the cutting off apparatus a holding guide which permits the arrangement therein of a set of replaceable and readily removable liners. The guide, together with the cutting apparatus assembled therewith, is adjustable transversely of the path of movement of the pipe or skelp delivered to the cutting apparatus, so that the liners can be positioned to bias the skelp or tube in any desired manner.

Adjusting mechanism is provided for moving the torch longitudinally along the pipe or skelp into proper position for cutting off accurate lengths; such adjustment is made after motion of the pipe or skelp has been halted, so that a quantity of the pipe or tubing, approximately that of the desired length, extends beyond the torch. For this purpose the torch-carrying apparatus is mounted for movement of substantial extent toward and away from the guiding and centering device.

It is an object of this invention to provide apparatus, which, when once set in position, will automatically operate to cut the pipe or skelp continuously until a complete circumferential cut has been made. This is effected by driving a plate upon which the cutting torch is mounted by an accurately governed motor.

Other objects of this invention will be apparent from the drawings and the description thereof.

On the drawings, in which apparatus comprising a preferred embodiment of the invention is disclosed:

Figure 1:
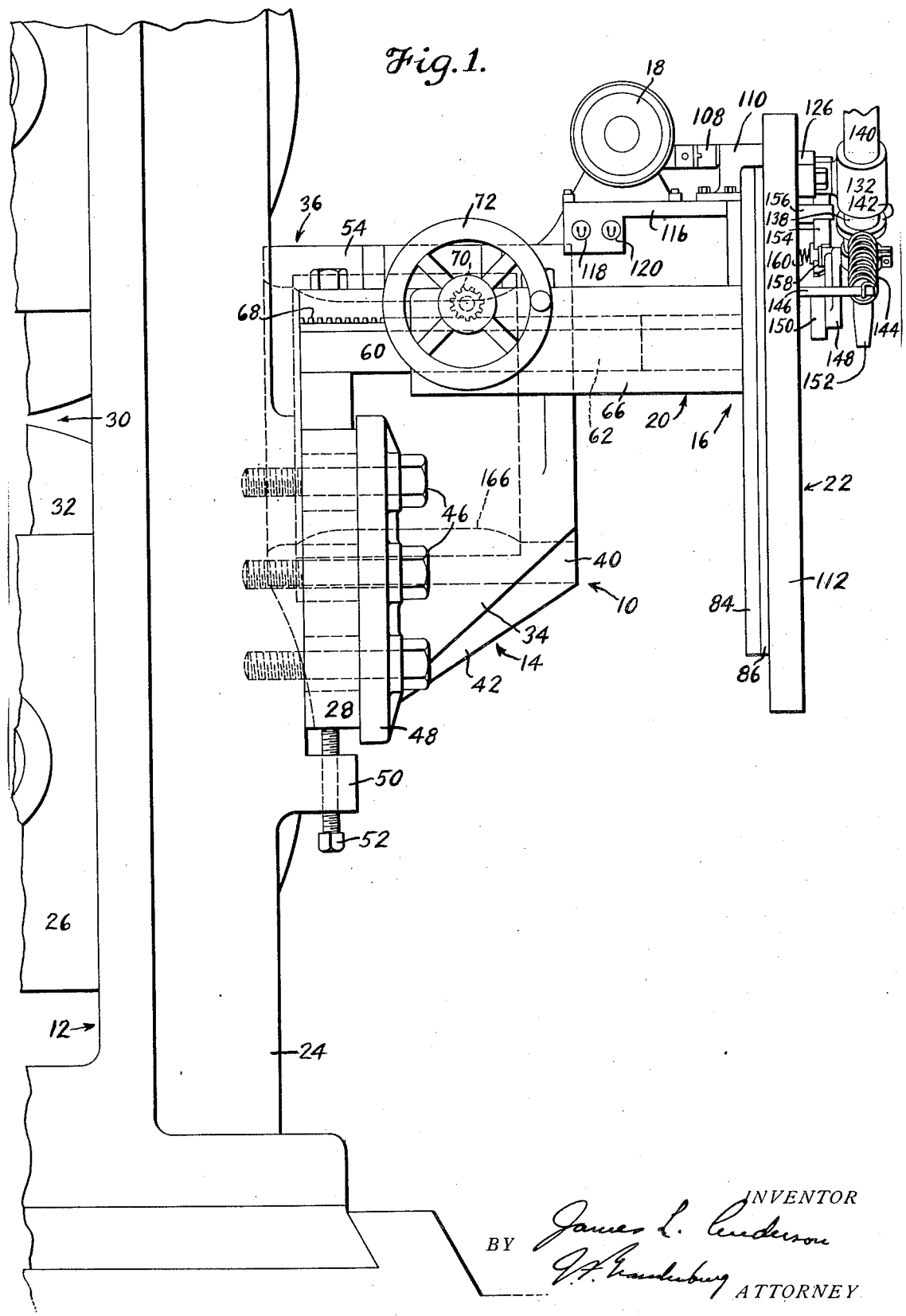
Fig. 1 is a side elevational view of pipe-cutting apparatus embodying the invention, shown assembled at the end of a skelp-forming mill.
Figure 2:
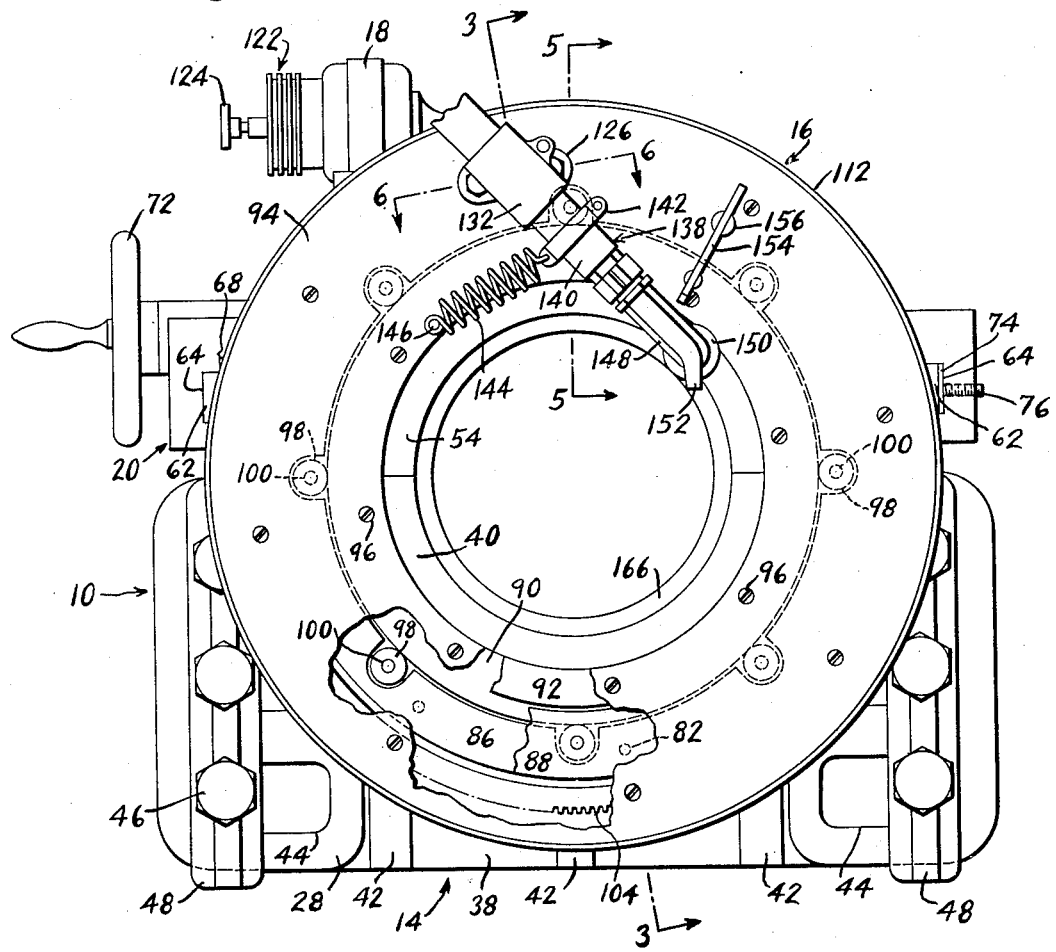
Fig. 2 is a front elevational view of the apparatus, portions being broken away to illustrate the construction thereof.
Figure 4:
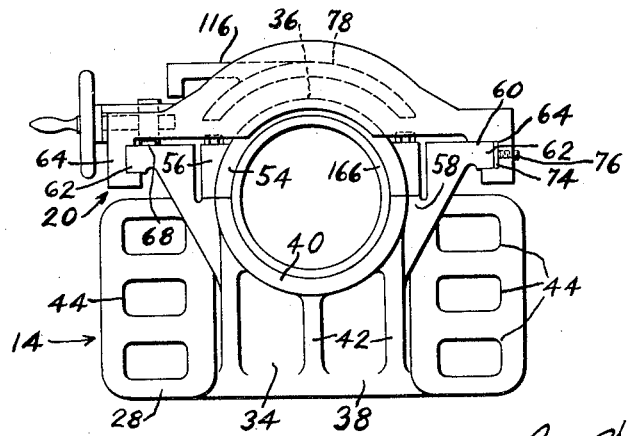
Fig. 4 is a front elevational view of the apparatus on a reduced scale, the torch-supporting plate being removed.
Figure 3:
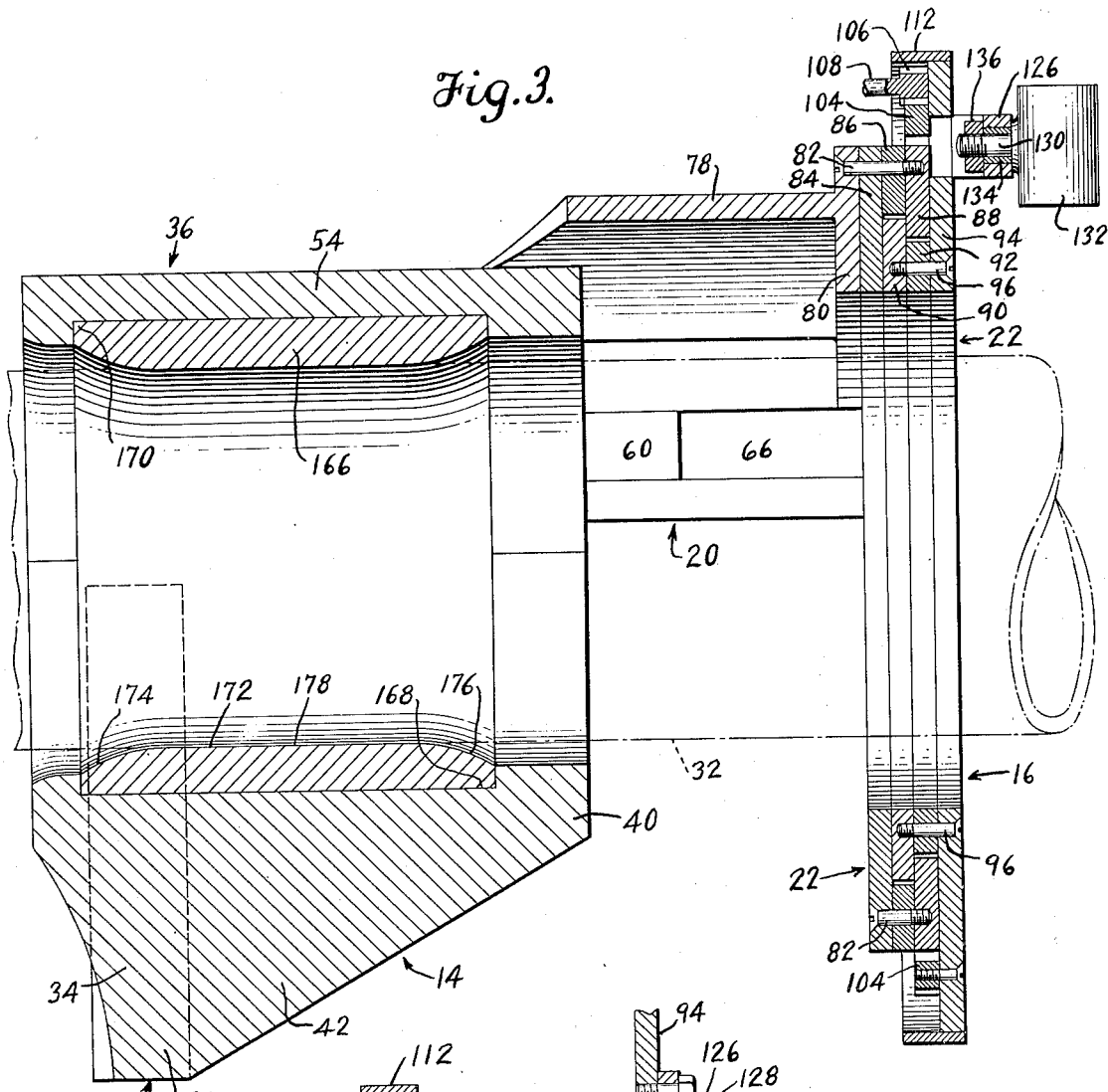
Fig. 3 is a view of the apparatus, separated from its mounting, and shown in longitudinal cross-section, the plates and the assembled rings being shown as if cut on the line 3—3 of Fig. 2.
Figure 5:
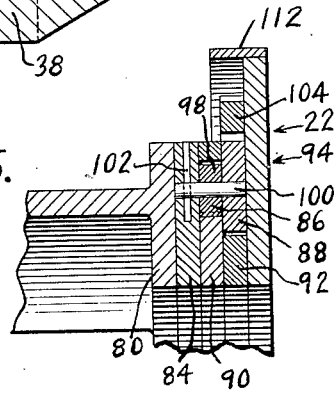
Figure 6:
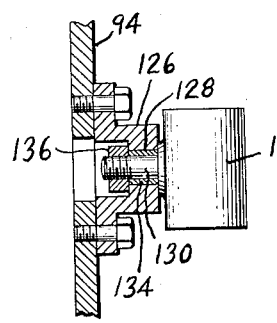

Fig. 5 is a sectional view on the line 5—5 of Fig. 2, illustrating the method of assembly of the torch-supporting and rotating elements; and Fig. 6 is a sectional view on the line 6—6 of Fig. 2, illustrating the arrangement of the torch-retaining sleeve upon the torch-supporting plate, the view being turned to a position as if the line 6—6 were vertical.

The apparatus 10, shown on the drawings, is assembled with a skelp or pipe forming machine 12, only the final portion of which is shown. Apparatus 10 comprises a guide 14, and the cutting device 16, powered by a motor 18. The cutting device consists of a longitudinal adjusting mechanism 20 and the torch supporting and moving assembly 22, all of which are more specifically described hereinafter.

The particular type of machine 12 with which apparatus 10 is associated is not of any moment, nor is it necessary that the apparatus be used directly in conjunction with any such apparatus. A preferred arrangement for purposes of efficiency and economy in mill operation, and also because of the support lent the pipe or skelp when the latter is extended through and beyond apparatus 10, makes desirable the mounting of this apparatus immediately at the discharge end of a skelp or pipe rolling mill 12, or at the discharge end of a pipe welding apparatus of any particular design. In the construction herein disclosed, apparatus 10 is mounted upon the columns 24 comprising the supports for the last roll stand 26 of machine 12. A head 28 of guide 14 is located in front of the opening 30 through which skelp or pipe 32 from machine 12 proceeds. The head is preferably formed as two separable mating castings 34 and 36. Casting 34 is formed as a support plate, from which extends the hollow half-cylinder 40 between the outside surface of which and plate 38 extend the strengthening ribs 42. A number of rectangular openings 44 through the plate provide passageways for cap screws 46, which also extend through clamp bars 48 positioned between the heads of the screws and the plate, and engage threaded holes in column 24. A boss 50 formed on column 24 receives one or more set-screws 52 for adjusting and retaining the plate in any desired vertical position. Plate 38 is thus made adjustable vertically and horizontally with relation to the discharge opening 30 and permits the positioning of the guide, as appears hereinafter, to produce any desired off-center relation of guide and delivery opening for subjecting pipe or skelp, fed therethrough, to bending forces of adjustable proportions. A hollow half-cylinder 54, formed as a separable unit, is received upon half-cylinder 40 to provide a cylindrical passageway for guiding pipe or skelp from machine 12 to cutting device 16. Flanges 56 and 58 at the junction surface of the half-cylinders provide means for the reception of securing bolts or the like to retain these portions fixedly, but removably assembled.

A cantilever arm 60 forms a part of casting 36 and extends therefrom. The longitudinal edges of arm 60 are machined or otherwise formed to provide machine ways 62 for the reception thereover of complementary machine ways 64 formed on a horizontally extending support arm 66. A rack 68 formed in or otherwise secured to the surface of arm 60 is engaged by a gear 70, housed and provided with a bearing in arm 66, so that on actuation of a hand-wheel 72 connected to gear 70 the arms 60 and 66 may be moved relatively. Arms 60 and 66, the associated ways, and the gear and rack structure assembled therewith, comprise the longitudinal adjusting mechanism 20 which provides means for positioning the cutting device, within suitable limits, longitudinally of pipe or skelp fed through the guide 14 in order to cut off accurate lengths thereof. Any preferred means, such as gib 74 and set-screw 76, may be provided to limit the freedom of movement of the arms, or to fix the arms in any predetermined relative position.

Extending upwardly from and substantially housing arm 66 is a semi-cylindrical shell 78, the outer face of which is formed with a half-ring-shaped flange 80. Pinned to flange 80, at 82, are rings 84, 86 and 88, all of substantially the same outside diameter but preferably with the inside diameters of rings 86 and 88 less than that of ring 84 and the diameter of ring 86 less than that of ring 88. Assembled with rings 84, 86 and 88 are rings 90 and 92 and the plate 94, likewise pinned together at 96 for movement as a unit. Rings 90 and 92 are assembled within rings 86 and 88, respectively; rollers 98, supported by means of pins 100 in rings 84 and 88, (pins 100 being in turn pinned, as at 102, to rings 84 and 86 to prevent separation), provide an anti-friction bearing between the two sets of interfitted rings.

Bolted to the inner face of plate 94 is an annular gear 104, with which engages a pinion 106 carried by a shaft 108, which has a bearing in an upright bracket 110. A cylindrical guard 112, secured to the outer face of plate 94, houses gear 104 and pinion 106. Shaft 108 is coupled to a reduction gearing driven by motor 18, which is carried upon a base 116 formed integrally with the upper surface of shell 78. Switches 118 and 120 on said base control operation of the motor, switch 118 governing the flow of current to the motor while switch 120 governs the direction of rotation of the motor, so that plate 94 can be rotated relatively to guide 14. The motor has a governor 122 adjustable by a knob 124.

Mounted eccentrically on the front face of plate 94 is a bridge member 126, having an opening 128, through which passes the pivot 130 of a torch-carrier sleeve 132. A bushing 134 around said pivot and within the opening abuts the body of the sleeve when a nut 136 is turned up on the inner end of the pivot against the bushing, and the sleeve and the torch carried thereby are thus afforded free rotational movement around pivot 130.

Supported in sleeve 132 is a thermal cutting device, the instrumentality particularly contemplated being an oxy-fuel gas torch 138. The torch may be of any conventional design having a body 140, to which may be secured a ring 142 for retaining one end of a spring 144, the other end of which is anchored, as at 146, to plate 94. An arm 148, securely fixed to and extending from body 140, carries a roller 150, which is preferably positioned adjacent tip 152 of the torch. The roller is at such elevation with reference to tip 152 that if a section of pipe or skelp be positioned in guide 14 and extend beyond plate 94, and if spring 144 be permitted to move the torch body to bring the roller into contact with the pipe or skelp section, tip 152 will be retained accurately adjusted in relation to, and spaced from, the surface of the pipe or skelp section. A finger 154 pivoted in a post 156, mounted on plate 94, has a catch 158 formed therewith to receive and retain arm 148 when the latter, together with the torch body, is moved away from the pipe or skelp surface. A coiled spring 160 beneath the finger forces it outwardly to engage forcibly catch 158 with the arm 148, and thus to prevent accidental separation of arm and catch. A cam surface at the end of the finger permits the arm to move easily into the position of retention.

Torch tip 152 is of any ordinary construction, and preferably bent so that by turning it about the axis of the torch body, the jets issuing therefrom can be disposed at any predetermined angle laterally of the pipe or skelp section so that either square or beveled edges may be cut.

In order to permit the use of the apparatus with pipe or skelp of varying sizes, some means of adjusting the size of the opening through guide 14 is necessary. Liners 166 are provided for this purpose and consist of metallic cylinders of uniform outside diameters which may be dropped into the semi-cylindrical recess 168 in the casting 34, after half-cylinder 54 has been removed therefrom. Half-cylinder 54 is then replaced, the recess 170 formed therein cooperating with recess 168 to retain the liner in position. The diameter of the inner surface 172 of the liner varies in accordance with the size of pipe or skelp to be handled. Surface 172 has the converging receiving, and diverging discharge, ends 174 and 176, respectively, which are rounded off to effect a graded working of the metal as pipe or skelp is fed therethrough. The middle portion 178 of the surface is preferably of a uniform diameter, and is preferably small enough to provide a definite holding of the pipe or tube in position to be operated upon by the torch as it is rotated around the work. The skelp edges are held in abutment during the cutting operation under the pressure exerted by the liner to permit accurate cutting. The center of the liner may be shifted, by means of set-screws 52, vertically with relation to the center of the pipe or skelp as the same comes from the machine 12, or by loosening screws 46, horizontally with relation thereto. By such adjustments, a counteracting bowing may be imparted to the pipe or skelp, for the purpose hereinabove set forth. While the center of guide 14 is thus made adjustable relatively to the pipe or skelp thereto delivered, no separate operation is necessary to bring the cutting device into the required relationship to such pipe or skelp after the guide has been properly positioned.

It is to be understood that the pipe or skelp section, extending beyond the cutting device, may be supported in any preferred manner, as on a roller support, or in a sling, suspended from any suitable point, such as a crane, above the apparatus.

As many changes could be made in the above construction and many widely different embodiments of the invention designed without departing from the scope of the invention, as defined in the accompanying claims, it is desired that the foregoing description be understood as being illustrative and not intended in a limiting sense.

I claim:

1. In apparatus of the character described, a fixed support, a guide thereon comprising two interlocked semi-cylindrical separable portions, a device for cutting pipe or skelp by means of an oxygen jet, said device being revolubly mounted on and adjustable longitudinally of one of said portions, and a liner removably received within and retained by said portions for guiding pipe or skelp and keeping it in relation to said cutting device, the other one of said portions having means for mounting said guide and said cutting device in transversely adjustable relation to pipe or skelp delivered thereto.

2. In apparatus of the character described, a support, a guide thereon comprising two interlocked semi-cylindrical separable portions, a device for cutting pipe or skelp by means of an oxygen jet, said device being revolubly mounted on one of said portions, and a liner removably received within and retained by said portions for guiding pipe or skelp and keeping it in relation to said cutting device, one of said portions having means for mounting said guide and said cutting device in transversely adjustable relation to pipe or skelp delivered thereto.

3. In apparatus of the character described, in combination, a support, a pipe or skelp guide thereon, and a device for cutting pipe or skelp by means of an oxygen jet, said device being revolubly mounted on said guide, and means for setting said guide and said cutting device as a unit in transversely adjustable relation to pipe or skelp delivered thereto.

4. In apparatus of the character described, a support, a guide comprising two interlocked semi-cylindrical separable portions, a device for cutting pipe or skelp by means of an oxygen jet, said device being rotatably mounted on one of said portions, and a liner removably received within said portions for guiding pipe or skelp to said cutting device.

5. In apparatus of the character described, a support, a guide, two interlocked semi-cylindrical separable portions, a device for cutting pipe or skelp by means of an oxygen jet, said device being rotatably mounted on and adjustable longitudinally of one of said portions, and a liner removably received within said portions for guiding pipe or skelp and keeping it in relation to said cutting device.

6. In apparatus of the character described, in combination, a support, a pipe or skelp guide comprising two interlocked semi-cylindrical separable portions, and a device for cutting pipe or skelp by means of an oxygen jet, said device being rotatably mounted on and adjustable longitudinally of one of said portions.

7. In combination, a pipe, skelp or tube mill, and means for cutting the product of said mill into predetermined lengths, said means including a thermal device for severing portions of the mill product, means to revolve said device about said product, and means for guiding the product to the severing device, said severing device being adjustable longitudinally of the mill product and toward and away from said guiding means, said guiding means, said revolving means and said device being mounted as a unit in relation to said mill, said revolving means being supported from said guiding means and said device being supported from said revolving means.

8. In combination, a pipe, skelp or tube mill, and means for cutting the product of said mill into predetermined lengths, said means including a thermal device for severing portions of the mill product, means to revolve said device about said product, and means for guiding the product to the severing device, said severing device being adjustable longitudinally of the mill product, said guiding means, said revolving means and said device being mounted as a unit in relation to said mill and being simultaneously adjustable transversely of the path of said mill product, said revolving means being supported from said guiding means and said device being supported from said revolving means.

9. In combination, a pipe, skelp or tube mill, and means for cutting the product of said mill into predetermined lengths, said means including a thermal device for severing portions of the mill product, means to revolve said device about said product, and means for guiding the product to the severing device, said guiding means, said revolving means and said device being mounted as a unit in relation to said mill, and being simultaneously adjustable transversely of the path of said mill product, said revolving means being supported from said guiding means and said device being supported from said revolving means.

10. In apparatus of the character described, in combination, a support, an oxy-fuel gas torch or like device, a revoluble carrier for said torch, means associated with said torch for contacting with tubular material to be cut and for properly spacing said torch in respect to said material, means including a cylindrical member for guiding tubular material or the like to the torch, and means providing adjustability between said guide and said support for counteracting the tendency of the material to bow, said torch being supported by said guiding means.

11. In apparatus of the character described, in combination, an oxy-fuel gas torch or like device, a revoluble carrier for said torch, means associated with said torch for contacting with tubular material to be cut and for properly spacing said torch in respect to said material, and means to receive cylindrical members of varying internal diameter for guiding tubular material of different sizes to the torch, said torch being supported by said guiding means.

12. In apparatus of the character described, in combination, an oxy-fuel gas torch or like device, a revoluble carrier for said torch comprising a plate having a passage, means associated with said torch for contacting with tubular material to be cut and for properly spacing said torch in respect to said material, means for guiding tubular material or the like to said passage, said last named means presenting an interior cylindrical guide surface concentric with said passage, a bearing for said plate, means for adjusting the relative spacing of said guiding means and said torch axially of the tubular material, and means for rotating said plate, said torch being supported by said guiding means.

13. In apparatus of the character described, in combination, an oxy-fuel gas torch or like device, a plate for supporting said torch having a passage, means associated with said torch for contacting with tubular material to be cut and for properly spacing said torch in respect to said material, means including a cylindrical member for guiding tubular material or the like to and for positioning said material centrally of said passage, a support for said plate, and means for rotating said plate, said torch being supported by said guiding means.

JAMES L. ANDERSON.